US008347080B2

(12) United States Patent
Bender et al.

(10) Patent No.: US 8,347,080 B2

(45) Date of Patent: Jan. 1, 2013

(54) SYSTEM AND METHOD FOR MULTI-CERTIFICATE AND CERTIFICATE AUTHORITY STRATEGY

(75) Inventors: Christopher Lyle Bender, Waterloo (CA); Roger Paul Bowman, Kitchener (CA)

(73) Assignee: Research In Motion Limited, Waterloo (CA)

( * ) Notice: Subject to any disclaimer, the term of this patent is extended or adjusted under 35 U.S.C. 154(b) by 275 days.

(21) Appl. No.: 12/776,541

(22) Filed: May 10, 2010

(65) Prior Publication Data

US 2011/0276803 A1 Nov. 10, 2011

(51) Int. Cl.
*G06F 21/00* (2006.01)

(52) U.S. Cl. ......... 713/156; 713/155; 713/157; 713/175

(58) Field of Classification Search .................. 713/175, 713/155–157

See application file for complete search history.

(56) References Cited

U.S. PATENT DOCUMENTS 6,751,729 B1 6/2004 Giniger et al.
6,871,276 B1 3/2005 Simon
6,882,730 B1 4/2005 Herbert et al.
6,976,163 B1 12/2005 Hind et al.
7,010,684 B2 3/2006 DeTreville
7,362,866 B2 4/2008 Zheng
8,037,314 B2 * 10/2011 Wood et al. .................. 713/180
8,166,529 B2 * 4/2012 O'Donoghue .................. 726/7
2003/0163685 A1 * 8/2003 Paatero ......................... 713/155
2004/0260928 A1 12/2004 Immonen
2005/0027985 A1 2/2005 Sprunk et al.
2007/0147619 A1 6/2007 Bellows et al.
2008/0052518 A1 2/2008 Newton et al.
2011/0029783 A1 * 2/2011 Thorsen ........................ 713/189

FOREIGN PATENT DOCUMENTS

WO WO 00/59225 A1 10/2000

OTHER PUBLICATIONS

Olaechea, Javier; Search Report from corresponding European Application No. 10162442.7; search completed Jul. 30, 2010.

Adams, C.; "Use of the CAST-128 Encryption Algorithm in CMS"; Oct. 2000; RFC 2984; Available at http://community.roxen.com/developers/idocs/frc/frc2984.txt.

(Continued)

*Primary Examiner* — Jeffrey Pwu
*Assistant Examiner* — William Corum, Jr.
(74) *Attorney, Agent, or Firm* — Blake, Cassels & Graydon LLP; Wilfred P. So; Brett J. Slaney

(57) ABSTRACT

Operations or functions on a device may require an operational certificate to ensure that the user of the device or the device itself is permitted to carry out the operations or functions. A system and a method are provided for providing an operational certificate to a device, whereby the operational certificate is associated with one or more operations of the device. A manufacturing certificate authority, during the manufacture of the device, obtains identity information associated with the device and provides a manufacturing certificate to the device. An operational certificate authority obtains and authenticates at least a portion of the identity information associated with the device from the manufacturing certificate and, if at least the portion of the identity information is authenticated, the operational certificate is provided to the device.

24 Claims, 13 Drawing Sheets

During manufacturing
12
Manufacturing Certificate Authority

300 Obtain multiple types of Device ID

302 Examples of different types of Device ID information:
-PIN number
-location where the device is built/manufactured
-time when the device is built/manufactured
-Employee ID of person performing manufacturing testing
-type of available hardware
⋮
-MAC address 304 Obtain the public key of the Device, where the public key corresponds to the Device's private key 306 Create a manufacturing authentication statement 308 Bind the manufacturing authentication statement and the public key to form a manufacturing certificate 310 Bind one or more device ID attributes to with the public key to form one or more subordinate attribute certificates, which are linked to the manufacturing certificate 314 Send manufacturing certificate, along with the one or more subordinate attribute certificates, to Device

OTHER PUBLICATIONS

Han, Kyusuk; Yeun, Chan Yeob; Kim, Kwangjo; "New Design of Generic Authentication Architecture Using ID-based Cryptosystem in 3GPP"; Available at http://caislab.kaist.ac.kr/publication/paper_files/2008/TriSAI2008_Kyusuk.pdf ; Accessed at least on Aug. 20, 2009.

Suomalainen, Pekka; "Public Key Infrastructure Deployment for Mobile Devices", Available at http://www.netlab.tkk.fi/opetus/s38310/03-04/kalvot03-04/suomalainen_0171003.pdf; Accessed at least on Aug. 20, 2009.

Cisco Unified CallManager Security Guide; "Chapter 6—Using the Certificate Authority Proxy Function"; Available at http://www.cisco.com/en.US/docs/voice_ip_comm/cucm/security/5_0 _2/secucapf.pdf ; Accessed at least on Aug. 14, 2009.

* cited by examiner

SYSTEM AND METHOD FOR MULTI-CERTIFICATE AND CERTIFICATE AUTHORITY STRATEGY

TECHNICAL FIELD

The following relates to systems and methods for providing an operational certificate to a device.

BACKGROUND

When an entity interacts with another entity, typically a process of verifying the identity of one another takes place. In this way, one entity can be confident that the other entity is "who" they claim to be. For example, when a user wishes to access an email account, the email account verifies the identity of the user. The user provides a password to the email account, which verifies the identity of the user and, if verified, the email account grants the user access.

Certificates may also be used to verify the identity of an entity, which typically includes information provided by a user. For example, when an authentication server proves its identity to an authenticating supplicant, the authenticating server provides a certificate, complete with an encrypted digital signature of a trusted certificate authority. A certificate can be created by any machine. However, typically a certificate is perceived to be authentic when it is signed. Based on the certificate, the authenticity of the entity is confirmed.

BRIEF DESCRIPTION OF THE DRAWINGS

Embodiments will now be described by way of example only with reference to the appended drawings wherein:

FIG. 1(*b*) is a schematic diagram illustrating another system in which a manufacturing certificate and one or more operational certificates are provided to a mobile device.

FIG. 14 (*b*) is a flow diagram illustrating example computer executable instructions for providing a mobile device with an operational certificate based on the revealed portions of device ID shown in FIG. 14 (*a*).

FIG. 14 (*c*) is a flow diagram illustrating example computer executable instructions for providing a mobile device with another operational certificate based on the revealed portions of device ID shown in FIG. 14 (*a*).

DETAILED DESCRIPTION OF THE DRAWINGS

Figure 1A:
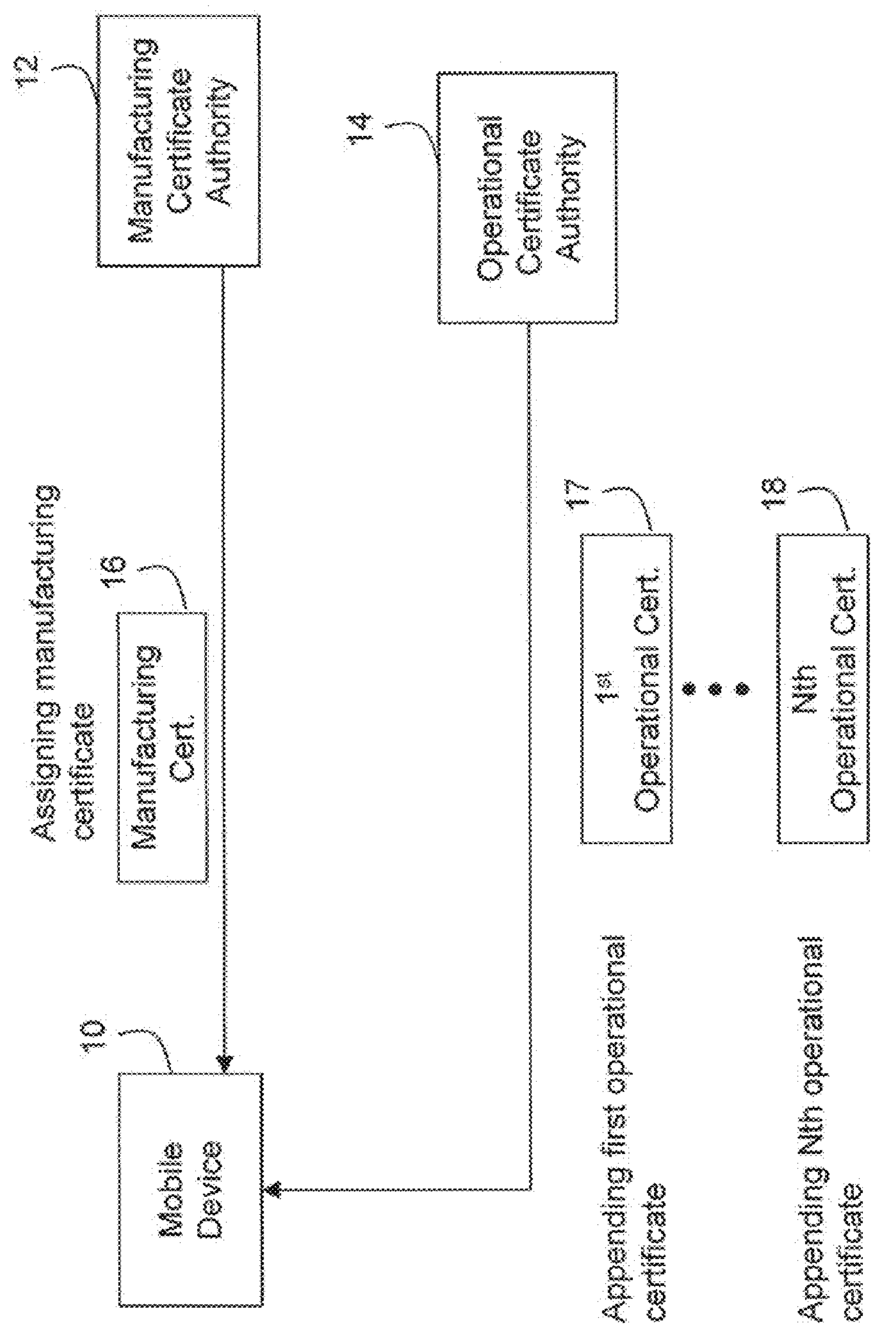
FIG. 1(*a*) is a schematic diagram illustrating a system in which a manufacturing certificate and one or more operational certificates are provided to a mobile device.

Operations or functions on a device may require an operational certificate to ensure that the user of the device or the device itself is permitted to carry out the operations or functions. For example, certain operations or functions on a device may be restricted due to required purchase fees, security levels, locations, or policy issues. In a more specific example, certain hardware functionality on a device is not operational in North America, while the same hardware functionality is operational in Europe.

Typically, operational certificates may be issued to a device based on other certificates, e.g. a root certificate, on the device, whereby the certificates identify the functional and operational limits of the device. For example, the root certificate may set out the time period or expiry that certain functions can be performed. However, the certificates are typically transient in nature and can easily be modified, removed, or created. This makes it difficult to identify whether or not the device itself is authentic.

In other instances, an operational certificate may be issued based on information provided by the user of the device. However, the information provided by the user can change over time, or with different users. For example, throughout the operational life of the device, there may be different owners or users. Therefore, it is difficult to obtain the identity of the device.

It can therefore be seen that based on typical certificate strategies, the identity of the device may be unreliable because it is based on transient, or easily modifiable information. Based on the above, a device's identity may change throughout the device's operational life time because new information may be added and used to identify the device. For example, a user of the device may add identity information, such as a user PIN, phone number, etc., to characterize the device. Therefore, entities, for example, those associated with an operational certificate authority, will attempt to determine whether or not the device's identity information is authentic with very little information, or information that is perceived to be unreliable. It can be understood that there are no means to query a device for authenticity of its origins.

It may also be desirable for a manufacturer to control an external entity's level of access or use of certain operations or functions on the device, even after the device leaves the manufacturing process.

It has been recognized that in order to address the above problems, a multi-certificate strategy and certificate authority strategy should be established during the manufacturing of the device. Such a strategy facilitates the management of the device's identity information. The multi-certificate strategy and certificate authority strategy involves two levels of certificates. At one level, a manufacturing certificate is dedicated to at least maintaining the identity of the device. At another level, an operational certificate is dedicated to determining the operational and functional abilities of the device, relative to an operational service. An operational service is an intermediary between a mobile device and an operational certificate authority. The separation of identity characteristics (e.g. attributes of obtained during the manufacture of the device) from operational characteristics into different certificate levels helps to maintain the identity of the device. The separation of identity characteristics also allows the identity information to be managed, taking into consideration the operational services. Further, it increases the confidence of an operational certificate authority when authenticating the device's identity.

In particular, a system and a method are provided for assigning or providing an operational certificate to a device, wherein the operational certificate is associated with one or more operations of the device. The method comprises a manufacturing certificate authority which, during the manufacture of the device, obtains identity information associated with the device and provides a manufacturing certificate to the device. The manufacturing certificate is linked with the identity information. Then, an operational certificate authority obtains and authenticates at least a portion of the identity information associated with the device through accessing the manufacturing certificate. If at least the portion of the identity information is authenticated, the operational certificate provides the operational certificate to the device.

In another aspect, the identity information may comprise one or more attributes. In one embodiment, the manufacturing certificate comprises the identity information. In another embodiment, one or more attribute certificates are provided, each comprising the one or more attributes of the identity information. The attribute certificates are linked to the manufacturing certificate. In some cases, one or more attribute certificates are not revealed to the operational certificate authority.

In another aspect, the operational certificate may comprise a portion of the identity information associated with the device. Alternatively, the operational certificate may comprise none of the identity information associated with the device. In yet another alternative, the operational certificate comprises all of the identity information associated with the device. In another aspect, the manufacturing certificate may remain with the device throughout its lifetime. It can also be appreciated that the manufacturing certificate is assigned or provided to the device in such a way that an operational certificate can be assigned or provided without modifying the manufacturing certificate.

In another aspect, examples of the identity information include any one of a PIN number, a location of the device's manufacture, hardware information, a time associated with the device's manufacture, an employee identification of a person associated with the device's manufacture, a listing of available hardware on the device, a listing of hardware capabilities and characteristics on the device, a Media Access Control (MAC) address, or combinations thereof.

In another aspect, the operational certificate may further comprise information provided by the user. In another aspect, the one or more operations of the device include, for example, email, GPS, instant messaging, phone service, address book, banking, etc.

Figure 1B:
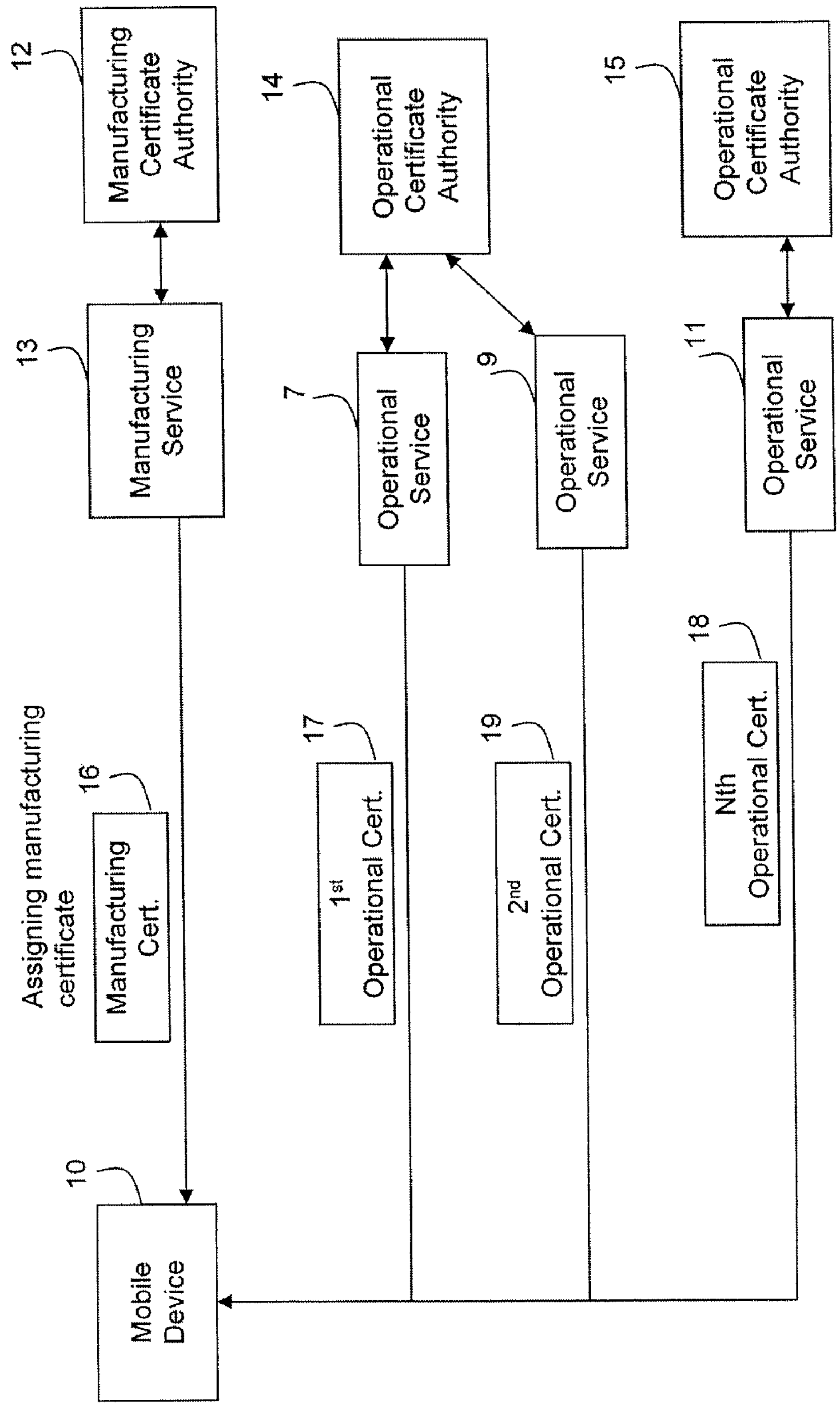

Turning to FIG. 1(*a*), a manufacturing certificate authority 12 assigns a manufacturing certificate 16 to a mobile device 10 during the manufacturing process or stage of the mobile device 10. Although specific reference is hereon made to a mobile device 10, it can be appreciated that any computing device, or more generally, device, is applicable the principles described herein.

Continuing with FIG. 1(*a*), an operational certificate authority 14, which is separate from the manufacturing certificate authority 12, provides the mobile device 10 with one or more operational certificates 17, 18. The operational certificate authority 14 provides the mobile device 10 with an operational certificate 17 after the mobile device 10 has received the manufacturing certificate 16. The operational certificate 17 may also be provided to the mobile device 10 during the manufacturing process, or after the manufacturing process, for example by an external entity. It can be appreciated that the operational certificate authority 14 and the manufacturing certificate authority 16 are computing devices are able to communicate with the mobile device 10 and with one another.

Multiple operational certificates 17, 18 can be appended to the manufacturing certificate 16. In particular, the manufacturing certificate 16 is provided with a high level of trust, and the on or more operational certificates 17, 18 are considered to have a lower level of trust. Using the certificate authority strategy, whereby the manufacturing certificate has more authority, the identity information of the mobile device 10 can be better maintained. Further details in this regards are explained below.

It can be appreciated that the manufacturing certificate authority 12 and the operational certificate authority 14 may not be in direct communication with the mobile device 10, but rather may communicate through one or more delegates or intermediary entities.

For example, turning to FIG. 1(*b*), another configuration is provided showing a manufacturing service 13 acting as intermediary between the mobile device 10 and the manufacturing certificate authority 12. The manufacturing service 13 is capable of executing or applying decision making rules, for example, to determine the authenticity of the mobile device's information before retrieving a manufacturing certificate 16 from the manufacturing certificate authority 12, and then sending the certificate 16 to the mobile device 10. Similarly, there may be an operational service 7 acting as an intermediary between the mobile device 10 and the operational certificate authority 14. It is also possible that another operational service 9 is in communication with the same operational certificate authority 14. In another embodiment, there may be another operational service 11 acting as an intermediary between a different operational certificate authority 15 and the mobile device 10. Each of the operational services 7, 9, 11 may provide their own operational certificates 17, 19, 18. It can thus be seen that there may be multiple operational services and multiple operational certificate authorities interacting with the mobile device 10. An operational service may include decision making abilities to verify, obtain, or provide information during the process of providing an operational certificate to the mobile device 10.

It can be appreciated that the manufacturing service 13 and the manufacturing certificate authority 12 may be the same entity, or may be separate entities in communication with one another. Similarly, an operational service and an operational certificate authority 12 may be the same entity, or may be separate entities in communication with one another.

The following examples include communications between mobile or handheld devices, which will be commonly referred to as mobile devices hereinafter and referred to by numeral 10. As discussed above, however, mobile devices 10 may also refer more generally to computing devices, which may or may not be mobile.

The mobile device 10 can be a multi-way communication device with advanced data communication capabilities including the capability to communicate with other mobile devices 10 or computer systems through a network of transceiver stations. The mobile device 10 may also have the capability to allow voice communication. Depending on the functionality provided by the mobile device 10, it may be referred to as a data messaging device, a multi-way pager, a cellular telephone with data messaging capabilities, a wireless Internet appliance, or a data communication device (with or without telephony capabilities). The mobile device 10 can also be one that is used in a system that is configured for continuously routing all forms of pushed information from a host system 25 to the mobile device 10. One example of such a system will now be described making reference to FIG. 2.

Figure 2:
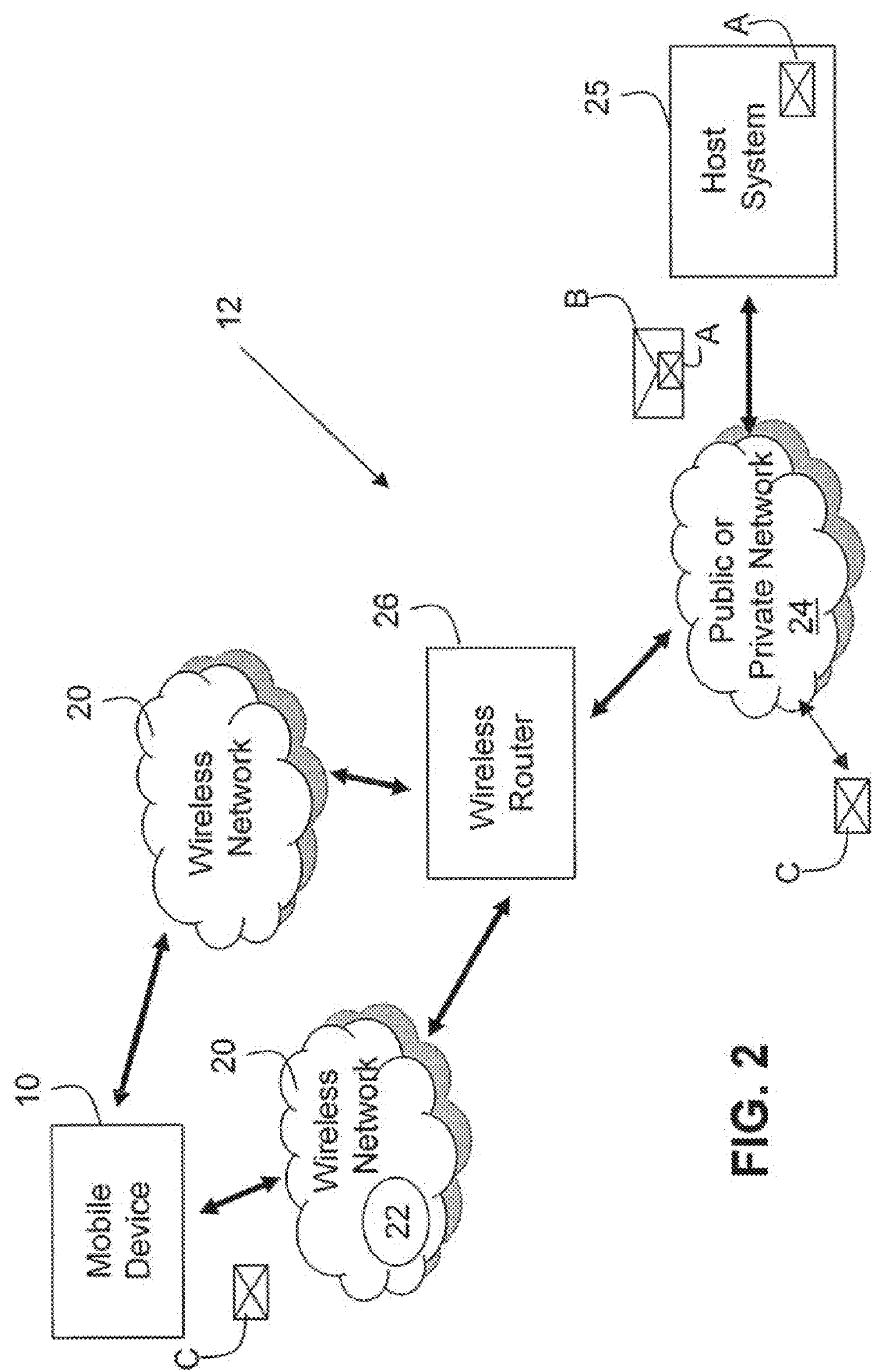
FIG. 2 is a schematic diagram illustrating a system in which data items are pushed from a host system to a mobile device.

FIG. 2 is an example system diagram showing the redirection of user data items (such as message A or C) from an intermediary computer system (host system) 25 to the user's mobile device 10 via a wireless router 26. The wireless router 26 provides the wireless connectivity functionality as it acts to both make transparent most of the wireless network's 20 complexities, and it also implements features necessary to support pushing data to the mobile device 10. Although not shown, a plurality of mobile devices may access data from the host system 25. In this example, message A in FIG. 2 represents an internal message sent from, e.g. a desktop computer (not shown) within the host system 25, to any number of server computers in the network (e.g. LAN), which may, in general, include a database server, an event server, an E-mail server or a voice-mail server.

Message C in FIG. 2 represents an external message from a sender that is not directly connected to the host system 25, such as the user's mobile device 10, some other user's mobile device (not shown), or any user connected to the public or private network 24 (e.g. the Internet). Message C could be e-mail, voice-mail, event information, database updates, web-page updates or could even represent a command message from the user's mobile device 10 to the host system 25. The host system 25 may comprise, along with the typical communication links, hardware and software associated with a computer network system, one or more wireless mobility agents, a TCP/IP connection, a collection of data stores, (for example a data store for e-mail could be an off-the-shelf mail server like Microsoft Exchange® Server or Lotus Notes® Server), all within and behind a network firewall.

The mobile device 10 may be adapted for communication within wireless network 20 via wireless links, as required by each wireless network 20 being used. As an illustrative example of the operation for a wireless router 26 shown in FIG. 2, consider a data item A, repackaged in outer envelope B (the packaged data item A now referred to as "data item (A)") and sent to the mobile device 10 from an Application Service Provider (ASP) in the host system 25. Within the ASP is a computer program, similar to a wireless mobility agent, running on any computer in the ASP's environment that is sending requested data items from a data store to a mobile device 10. The mobile-destined data item (A) is routed through the network 24, and through the wireless router's 26 firewall protecting the wireless router 26 (not shown).

Although the above describes the host system 25 as being used within a networked environment, this is just one embodiment of one type of host service that offers push-based messages for a handheld wireless device that is capable of notifying and presenting the data to the user in real-time at the mobile device when data arrives at the host system.

By offering a wireless router 26 (sometimes referred to as a "relay", "message server", "data redirector", etc.), there are a number of major advantages to both the host system 25 and the wireless network 20. The host system 25 in general runs a host service that is considered to be any computer program that is running on one or more computer systems. The host service is said to be running on a host system 25, and one host system 25 can support any number of host services. A host service may or may not be aware of the fact that information is being channeled to mobile devices 10. For example an e-mail or message program 138 (see FIG. 3) might be receiving and processing e-mail while an associated program (e.g. an e-mail wireless mobility agent) is also monitoring the mailbox for the user and forwarding or pushing the same e-mail to a wireless device 10. A host service might also be modified to prepared and exchange information with mobile devices 10 via the wireless router 26, like customer relationship management software. In a third example, there might be a common access to a range of host services. For example a mobility agent might offer a Wireless Access Protocol (WAP) connection to several databases.

Although the system is exemplified as operating in a multi-way communications mode, certain aspects of the system could be used in a "one and one-half" or acknowledgment paging environment, or even with a one-way paging system. In such limited data messaging environments, the wireless router 26 still could abstract the mobile device 10 and wireless network 20, offer push services to standard web-based server systems and allow a host service in a host system 25 to reach the mobile device 10 in many countries.

The host system 25 shown herein can have many methods when establishing a communication link to the wireless router 26. For one skilled in the art of data communications the host system 25 could use connection protocols like TCP/IP, X.25, Frame Relay, ISDN, ATM or many other protocols to establish a point-to-point connection. Over this connection there are several tunnelling methods available to package and send the data, some of these include: HTTP/HTML, HTTP/XML, HTTP/Proprietary, FTP, SMTP or some other proprietary data exchange protocol. The type of host systems 25 that might employ the wireless router 26 to perform push could include: field service applications, e-mail services, stock quote services, banking services, stock trading services, field sales applications, advertising messages and many others. This wireless network 20 abstraction is made possible by the wireless router 26, which implements this routing and push functionality. The type of user-selected data items being exchanged by the host could include: E-mail messages, events, meeting notifications, address entries, journal entries, personal alerts, alarms, warnings, stock quotes, news bulletins, bank account transactions, field service updates, stock trades, heart-monitoring information, vending machine stock levels, meter reading data, GPS data, etc., but could, alternatively, include any other type of message that is transmitted to the host system 25, or that the host system 25 acquires through the use of intelligent agents, such as data that is received after the host system 25 initiates a search of a database or a website or a bulletin board.

The wireless router 26 provides a range of services to make creating a push-based host service possible. These networks may comprise: (1) the Code Division Multiple Access (CDMA) network, (2) the Groupe Special Mobile or the Global System for Mobile Communications (GSM) and the General Packet Radio Service (GPRS), and (3) the existing and upcoming third-generation (3G) and fourth generation (4G) networks like EDGE, UMTS and HSDPA, LTE, Wi-Max etc. Some older examples of data-centric networks include, but are not limited to: (1) the Mobitex Radio Network ("Mobitex") and (2) the DataTAC Radio Network ("DataTAC").

To be effective in providing push services for host systems 25, the wireless router 26 may implement a set of defined functions. It can be appreciated that one could select many different hardware configurations for the wireless router 26, however, many of the same or similar set of features would likely be present in the different configurations. The wireless router 26 may offer any one or more of the following features for host services: 1) An addressing method so that mobile device 10 traffic can be addressed to a host system 25 without the need for the wireless network 20 to assign an identity to each host system 25; 2) An efficient and authenticated method for the host system 25 to initiate a communication connection to the wireless router 26 for the purposes of opening a communication tunnel to the one or more mobile devices 10 that the host system 25 wishes to communicate with; 3) A reliable method for exchanging data between the host system 25 and the mobile device 10, in a manner consistent with the abilities of the wireless network 20; 4) Providing feedback to the host system 25 when data is delivered, which allows the host system to clean up any wireless delivery queues if necessary, or inform the original sender (user or program) that the data has been delivered to the mobile device 10; 5) Implementation of a wireless network 20 initiated push of services or data to a mobile device 10, from a wireless router 26; and 6) Connect to a wide range of wireless networks 20 and provide a way of tracking the user's location so that a 'follow you anywhere' solution can be provided.

Figure 3:
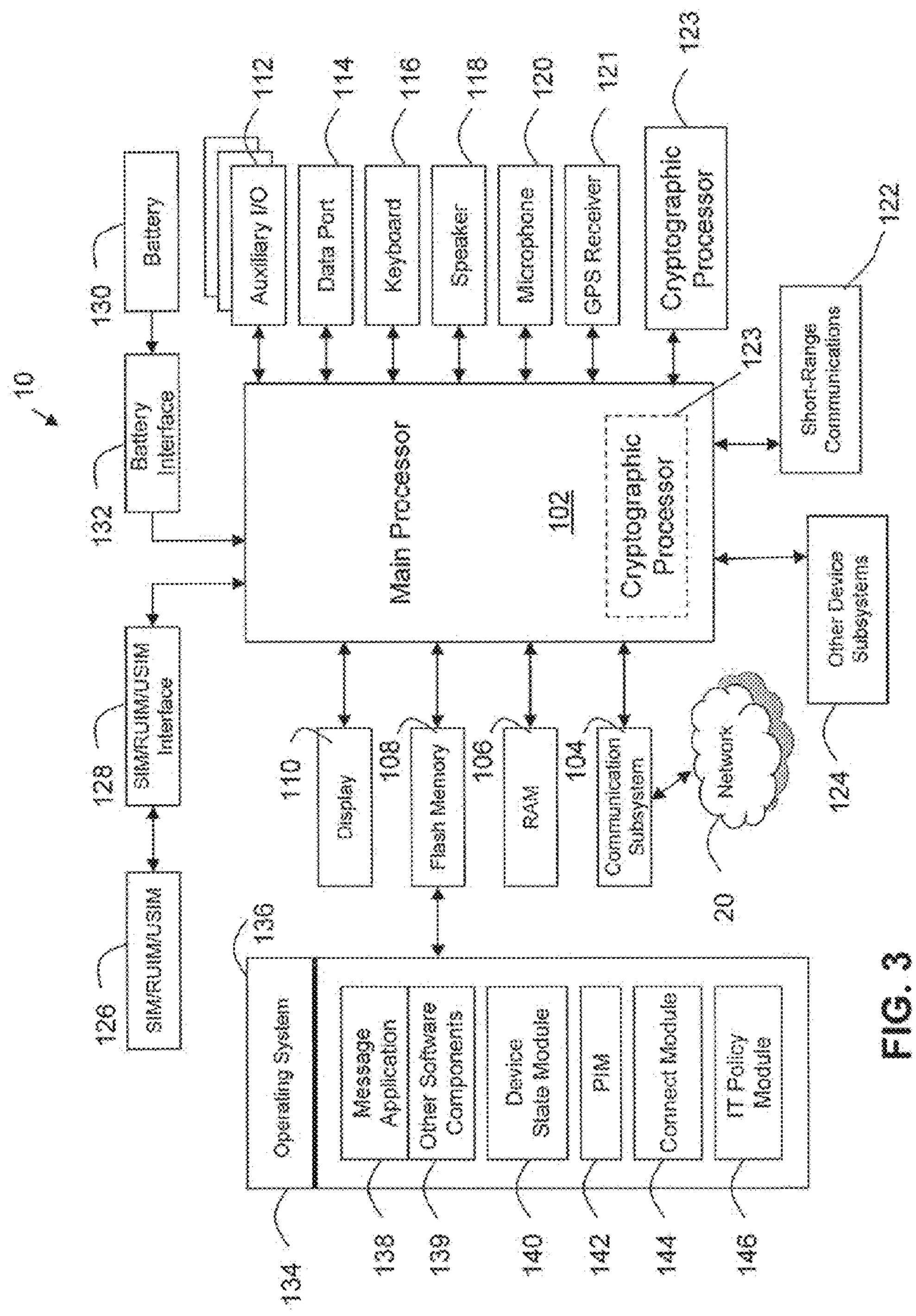
FIG. 3 is a block diagram of an example embodiment of a mobile device.
Figure 4:
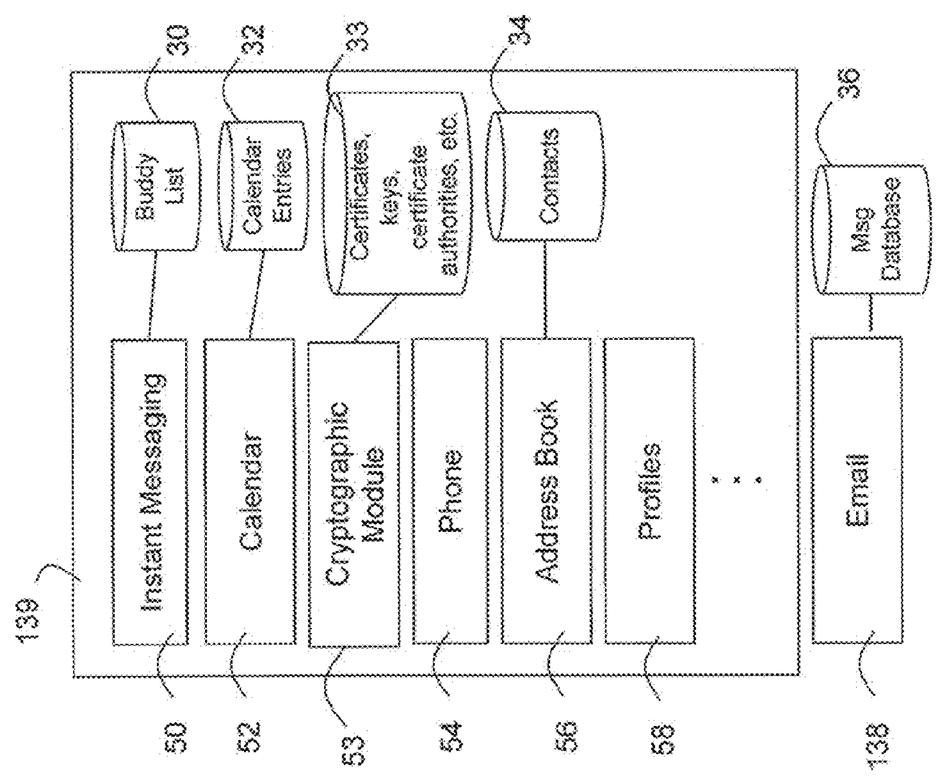
FIG. 4 is a block diagram illustrating example ones of the other software applications and components shown in FIG. 3.

An example configuration for the mobile device 10 is illustrated in FIGS. 3-4. Referring first to FIG. 3, shown therein is a block diagram of an example embodiment of a mobile device 10. The mobile device 10 comprises a number of components such as a main processor 102 that controls the overall operation of the mobile device 10. Communication functions, including data and voice communications, are performed through a communication subsystem 104. The communication subsystem 104 receives messages from and sends messages to a wireless network 20. In this example embodiment of the mobile device 10, the communication subsystem 104 is configured in accordance with the GSM and GPRS standards, which are used worldwide. Other communication configurations that are equally applicable are the 3G and 4G networks discussed above. New standards are still being defined, but it is believed that they will have similarities to the network behaviour described herein, and it will also be understood by persons skilled in the art that the embodiments described herein are intended to use any other suitable standards that are developed in the future. The wireless link connecting the communication subsystem 104 with the wireless network 20 represents one or more different Radio Frequency (RF) channels, operating according to defined protocols specified for GSM/GPRS communications.

The main processor 102 also interacts with additional subsystems such as a Random Access Memory (RAM) 106, a flash memory 108, a display 110, an auxiliary input/output (I/O) subsystem 112, a data port 114, a keyboard 116, a speaker 118, a microphone 120, a GPS receiver 121, short-range communications 122, and other device subsystems 124. As will be discussed below, the short-range communications 122 can implement any suitable or desirable device-to-device or peer-to-peer communications protocol capable of communicating at a relatively short range, e.g. directly from one device to another. Examples include Bluetooth®, ad-hoc WiFi, infrared, or any "long-range" protocol re-configured to utilize available short-range components. It will therefore be appreciated that short-range communications 122 may represent any hardware, software or combination of both that enable a communication protocol to be implemented between devices or entities in a short range scenario, such protocol being standard or proprietary.

Some of the subsystems of the mobile device 10 perform communication-related functions, whereas other subsystems may provide "resident" or on-device functions. By way of example, the display 110 and the keyboard 116 may be used for both communication-related functions, such as entering a text message for transmission over the network 20, and device-resident functions such as a calculator or task list.

The mobile device 10 can send and receive communication signals over the wireless network 20 after required network registration or activation procedures have been completed. Network access is associated with a subscriber or user of the mobile device 10. To identify a subscriber, the mobile device 10 may use a subscriber module component or "smart card" 126, such as a Subscriber Identity Module (SIM), a Removable User Identity Module (RUIM) and a Universal Subscriber Identity Module (USIM). In the example shown, a SIM/RUIM/USIM 126 is to be inserted into a SIM/RUIM/USIM interface 128 in order to communicate with a network. Without the component 126, the mobile device 10 is not fully operational for communication with the wireless network 20. Once the SIM/RUIM/USIM 126 is inserted into the SIM/RUIM/USIM interface 128, it is coupled to the main processor 102.

The mobile device 10 is typically a battery-powered device and in this example includes a battery interface 132 for receiving one or more rechargeable batteries 130. In at least some embodiments, the battery 130 can be a smart battery with an embedded microprocessor. The battery interface 132 is coupled to a regulator (not shown), which assists the battery 130 in providing power V+ to the mobile device 10. Although current technology makes use of a battery, future technologies such as micro fuel cells may provide the power to the mobile device 10.

In the examples described herein, the mobile device 10 comprises or otherwise has access to a cryptographic processor 123 which can be embodied in hardware, software, or a combination of the two. Also, as will be discussed below, the cryptographic processor 123 may control or include a cryptographic module 53 which may represent an cryptographic or security related application that cryptographically processes data. The mobile device 10 may also comprise internal or external memory or other computer readable media for storing computer executable instructions for enabling the cryptographic processor 123 to perform cryptographic operations as is known in the art. As can be seen in FIG. 3, the cryptographic processor 123 may be independent of the main processor 102 in a mobile device configuration, or may be implemented by special instructions or hardware associated with the main processor 102 itself.

The mobile device 10 also includes an operating system 134 and software components 136 to 146 which are described in more detail below. The operating system 134 and the software components 136 to 146 that are executed by the main processor 102 are typically stored in a persistent store such as the flash memory 108, which may alternatively be a read-only memory (ROM) or similar storage element (not shown). Those skilled in the art will appreciate that portions of the operating system 134 and the software components 136 to 146, such as specific device applications, or parts thereof, may be temporarily loaded into a volatile store such as the RAM 106. Other software components can also be included, as is well known to those skilled in the art.

The subset of software applications 136 that control basic device operations, including data and voice communication applications, may be installed on the mobile device 10 during its manufacture. Software applications may include a message application 138, a device state module 140, a Personal Information Manager (PIM) 142, a connect module 144 and an IT policy module 146. A message application 138 can be any suitable software program that allows a user of the mobile device 10 to send and receive electronic messages, wherein messages are typically stored in the flash memory 108 of the mobile device 10. A device state module 140 provides persistence, i.e. the device state module 140 ensures that important device data is stored in persistent memory, such as the flash memory 108, so that the data is not lost when the mobile device 10 is turned off or loses power. A PIM 142 includes functionality for organizing and controlling data items of interest to the user, such as, but not limited to, e-mail, text messages, instant messages, contacts, events, and voice mails, and may interact with the wireless network 20. A connect module 144 implements the communication protocols that are required for the mobile device 10 to communicate with the wireless infrastructure and any host system 25, such as an enterprise system, that the mobile device 10 is authorized to interface with. An IT policy module 146 receives IT policy data that encodes the IT policy, and may be responsible for organizing and securing rules such as the "Set Maximum Password Attempts" IT policy.

Other types of software applications or components 139 can also be installed on the mobile device 10. These software applications 139 can be pre-installed applications (i.e. other than message application 138) or third party applications, which are added after the manufacture of the mobile device 10. Examples of third party applications include games, calculators, utilities, etc. The additional applications 139 can be loaded onto the mobile device 10 through at least one of the wireless network 20, the auxiliary I/O subsystem 112, the data port 114, the short-range communications subsystem 122, or any other suitable device subsystem 124.

The data port 114 can be any suitable port that enables data communication between the mobile device 10 and another computing device. The data port 114 can be a serial or a parallel port. In some instances, the data port 114 can be a USB port that includes data lines for data transfer and a supply line that can provide a charging current to charge the battery 130 of the mobile device 10.

For voice communications, received signals are output to the speaker 118, and signals for transmission are generated by the microphone 120. Although voice or audio signal output is accomplished primarily through the speaker 118, the display 110 can also be used to provide additional information such as the identity of a calling party, duration of a voice call, or other voice call related information.

For composing data items, such as e-mail messages, for example, a user or subscriber could use a touch-sensitive overlay (not shown) on the display 110 that is part of a touch screen display (not shown), in addition to possibly the auxiliary I/O subsystem 112. The auxiliary I/O subsystem 112 may include devices such as: a mouse, track ball, infrared fingerprint detector, or a roller wheel with dynamic button pressing capability. A composed item may be transmitted over the wireless network 20 through the communication subsystem 104.

FIG. 4 shows an example of the other software applications and components 139 that may be stored on and used with the mobile device 10. Only examples are shown in FIG. 4 and such examples are not to be considered exhaustive. In this example, an instant messaging application 50, calendar application 52 (or other event related organizer), a cryptographic module 53, phone application 54, address book 56 and a profiles application 58 are shown to illustrate the various features that may be provided by the mobile device 10. Also shown in FIG. 4 is the message application 138, which in the following will be referred to as an email application 138 for clarity and stores or otherwise has access to a message database 36 for storing incoming and outgoing messages as well as those stored in various folders. It will be appreciated that the various applications may operate independently or may utilize features of other applications. For example, the phone application 54 and email application 138 may use the address book 56 for contact details obtained from a list of contacts 34.

The instant messaging application 50 is an instant messaging service that may hosted and provided by the host system 25, e.g. using a messaging server at the wireless router 26 or may be associated with a 3$^{rd}$ party instant messaging service (not shown). The instant messaging application 50 comprises or otherwise has access to contact information often referred to as a "buddy" list 30. The calendar application 52 comprises or otherwise has access to a portion of memory, database or other data storage device storing calendar entries 32, which may include any data or information associated with a particular date and time in the calendar application 52 and may be displayed in a graphical user interface (GUI) therefor. It can be appreciated that such software applications and components 139 may require one or more operational certificates 17, 18 to operate or function on the mobile device 10.

Continuing with FIG. 4, the cryptographic module 53 comprises or otherwise has access to a portion of memory, database or other data storage device for cryptographic data 33, which may include any data or information associated with the cryptographic functions between the certification authorities and the mobile device 10. In particular, the stored data 33 includes, for example, certificates, public and private keys, and a listing of certificate authorities.

It will be appreciated that any module or component exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the mobile device 10, wireless router 26, host system 25, etc., or accessible or connectable thereto. Any application or module herein described may be implemented using computer readable/executable instructions that may be stored or otherwise held by such computer readable media.

A number of figures are discussed below with respect to the method of providing an operational certificate to a mobile device 10. Although reference is made mostly to the operational certificate authority and manufacturing certificate authority, as described earlier, it can be appreciated that the operational certificate authority can include an operational service, and that the manufacturing certificate authority can include a manufacturing service.

Figure 5:
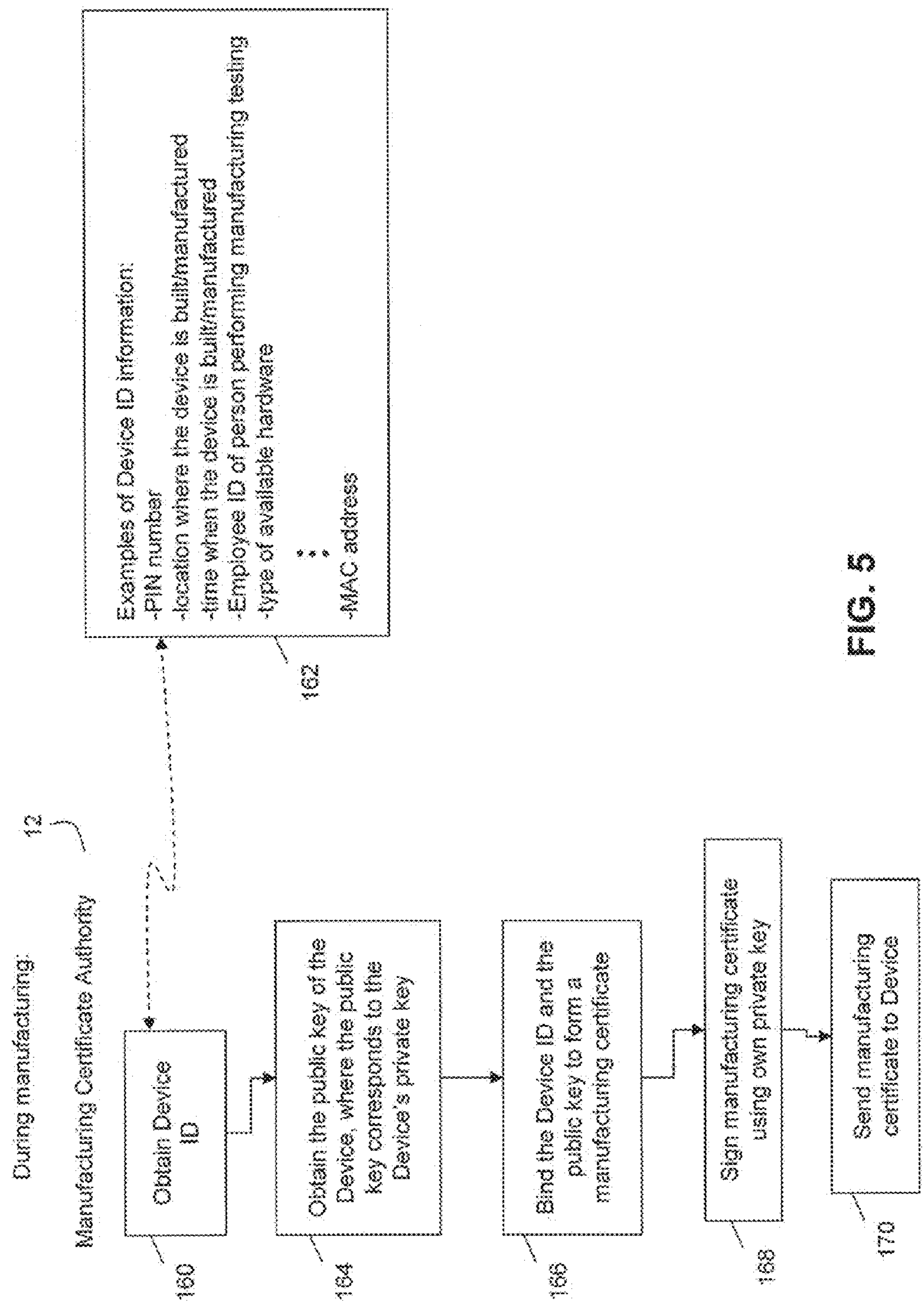
FIG. 5 is a flow diagram illustrating example computer executable instructions for providing a manufacturing certificate to a mobile device.

Turning now to FIG. 5, example computer executable instructions are provided for providing a manufacturing certificate to a mobile device 10. During the manufacturing process of the mobile device 10, the manufacturing certificate authority 12 obtains the identity information or device ID (block 160). As per block 162, the device ID can include one or more types of information. Non-limiting examples of such information include a PIN number; the location where the mobile device 10 was built or manufactured; the time or date, or both, when the mobile device 10 was built or manufactured; an employee identification of the person performing a process in the manufacturing process (e.g. testing); hardware characteristics or capabilities and a MAC address. Preferably, although not necessarily, the identity information or device ID from the mobile device 10 will be authenticated or verified by the manufacturing certificate authority or manufacturing service. For example, the identity information from the mobile device 10 will be signed by the private key of the mobile device 10 to prove authenticity.

At block 164, the public key associated with the mobile device 10 is also obtained by the manufacturing certificate authority 12. The public key corresponds to a private key belonging to the mobile device 10. As discussed above, a delegate or intermediary entity (not shown) may be acting on behalf of the manufacturing certificate authority 12. At block 166, the manufacturing certificate authority 12 binds the device ID and the public key to form a manufacturing certificate 16. At block 168, the manufacturing certificate authority 12 may sign the manufacturing certificate 16 using its own private key. At block 170, the manufacturing certificate authority 12 sends the manufacturing certificate 16 to the mobile device 10.

Figure 6:
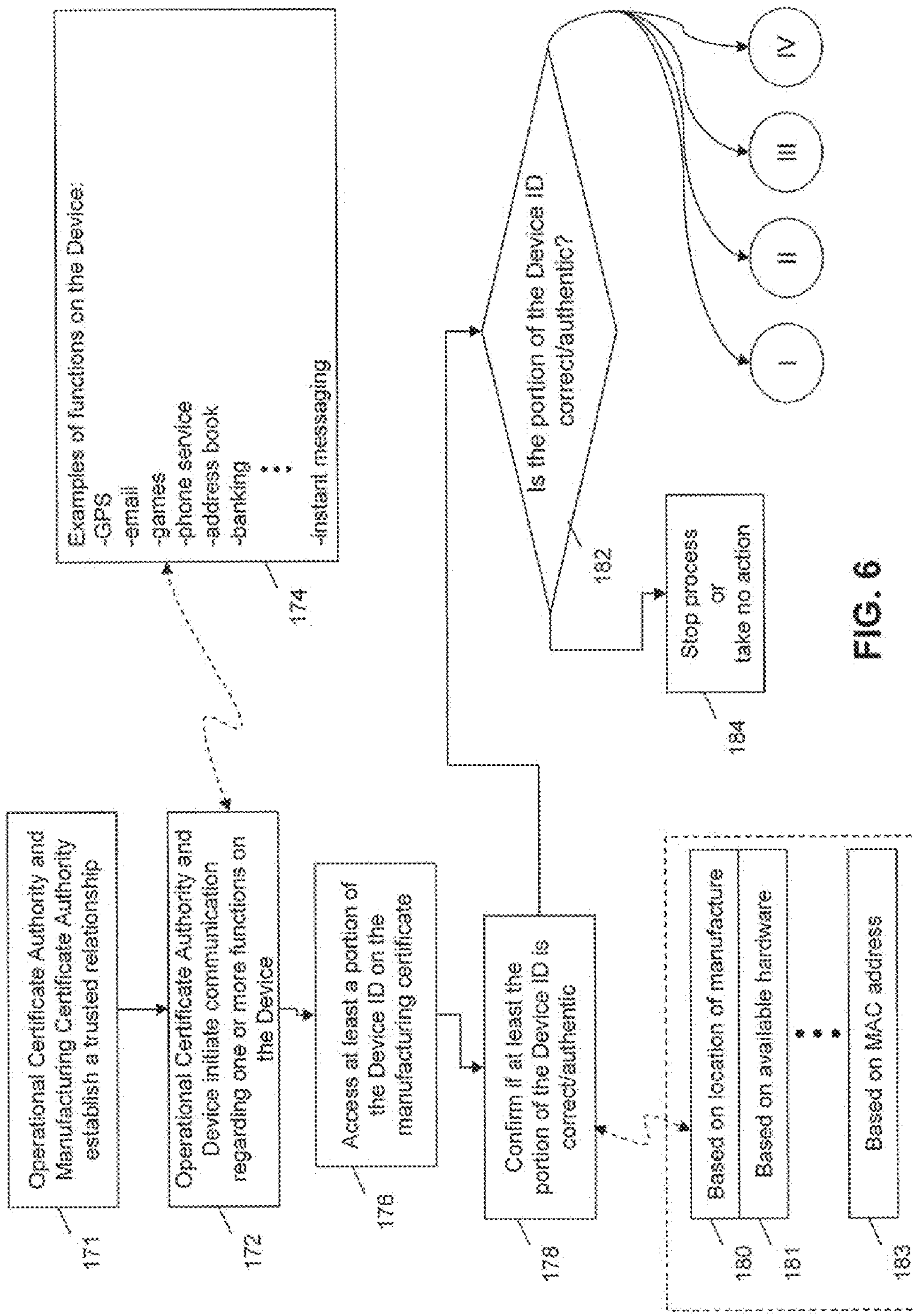
FIG. 6 is a flow diagram illustrating example computer executable instructions for providing an operational certificate to a mobile device.

Turning to FIG. 6, example computer executable instructions are provided for assigning or providing an operational certificate to the mobile device 10. Upon the mobile device 10 receiving the manufacturing certificate 16, the mobile device 10 may receive one or more operational certificates 17, 18 later on in the manufacturing process or when the mobile device 10 has entered into the field for use.

In an example of providing an operational certificate 17 later on in the manufacturing process, at the request of an operational service provider, a mobile device 10 may leave the manufacturer with an initial or default operational certificate 17 for the operational service provider. This operational service provider may then update or change the initial operational certificate 17 through interactions with the mobile device 10 and the operational certificate authority 14.

In particular, at block 171, the operational certificate authority 14 and the manufacturing certificate authority 12 establish a trusted relationship with each other. This trusted relationship can be established by the manufacturing certificate authority 12 providing its root certificate to the operational certificate authority 12. At block 172, the operational certificate authority 14 and mobile device 10 initiate communication regarding one or more of the functions on the mobile device 10. Non-limiting examples of functions on the mobile device 10 are shown in block 174 and include: GPS, email, games, phone service, address book, banking, instant messaging, etc. At block 176, at least a portion of the device ID, that is stored on the manufacturing certificate 16, is obtained by or provided to the operational certificate authority 14. At block 178, the operational certificate authority 14 then confirms if the obtained device ID is authentic. In one embodiment, the operational certificate authority 14 determines the authenticity by comparing the digital signature of the manufacturing certificate 16, which has been signed by the manufacturing certificate authority 12, with the root certificate provided by the manufacturing certificate authority 12. It can be appreciated that there may be other ways to confirm the authenticity of the device ID, which may be specific to the applications. For example, at block 180, the operational certificate authority 14 may use conditions or rules related to the location of manufacture of the mobile device 10, which could be provided through the device ID. In a particular example, a music service provider in the United States may only allow devices manufactured in the United States or sold to carriers in the United States to use their service. In another example, at block 181, the authenticity of the device ID may be based on the type of electronic or mechanical hardware in the mobile device 10, which would be an attribute captured in the device ID associated with the manufacturing certificate 16. As a particular example, a GPS service provided would only allow mobile devices 10 with certain GPS hardware to use the GPS service. In another example, at block 183, the authenticity of the device ID may be based on the MAC address, which would be an attribute captured in the device ID associated with the manufacturing certificate 16. As a particular example, a WiFi service provider may only function on mobile devices 10 based on certain MAC addresses of the WiFi hardware (e.g. WiFi chip) on the mobile device 10. In yet another example, the WiFi service provider's operational certificate authority may examine the company who produced the WiFi chip on the mobile device 10, the company information being provided as part of the device ID associated with the manufacturing certificate 16. It can thus be seen that the verification process using the device ID or the manufacturing certificate can include many different variations, which are applicable to the principles of the invention described herein.

At block 182, if it is determined that the device ID is not authentic or not correct, then at block 184 the process for providing an operational certificate to the mobile device 10 ends, or alternatively no action is taken. However, if the obtained device ID is authentic, then a number of options are provided. These options are represented in FIG. 6 as numerals I, II, III and IV, and are continued with respect to FIGS. 7, 8, 9, and 10.

Figure 7:
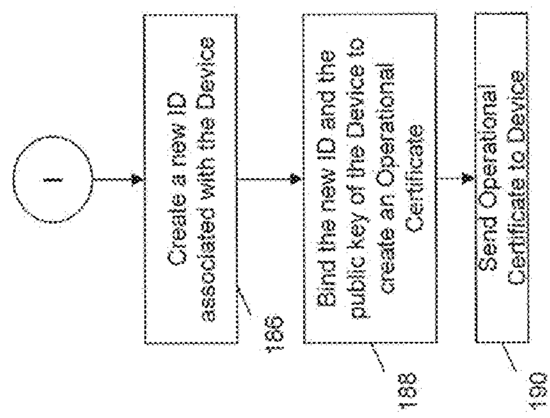
FIG. 7 is a flow diagram continuing from FIG. 6 illustrating example computer executable instructions for creating and using a new ID to create an operational certificate.

Turning to FIG. 7, as indicated by numeral I, one option is to create a new identification or ID that is associated with the mobile device 10 (block 186). Then the operational certificate authority 14 binds the new ID and the public key of the mobile device 10 to create an operational certificate. It can be appreciated that the public key of the mobile device 10 corresponds with the private key of the mobile device 10. At block 190, the operational certificate authority 14 sends the operational certificate to the mobile device 10.

This option protects the identity information or the device ID of the mobile device 10, since the operational certificate contains none of the identity information that was obtained during the manufacturing process. In other words, if the operational certificate was accessed and the information on the operational certificate was changed, this would not affect the device ID of the manufacturing certificate 16.

Figure 8:
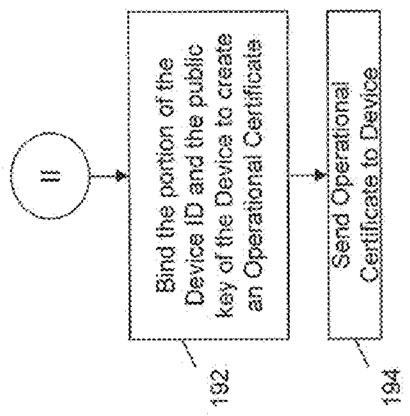
FIG. 8 is a flow diagram continuing from FIG. 6 illustrating example computer executable instructions for using a portion of the device ID to create an operational certificate.

Turning to FIG. 8, another option, as indicated by numeral II, includes binding a portion of the device ID and the public key of the mobile device 10 to create an operational certificate (block 192). In particular, a portion of the device ID, or identity information, that was obtained is bound with the public key. At block 194, the operational certificate authority 14 sends or assigns the operational certificate to the mobile device 10.

This option also protects the information identity or device ID, since a portion of the identity information is bound to the operational certificate, while the remaining portion remains with the mobile device 10. Therefore, access to the operational certificate does not provide access to the complete identity information of the mobile device 10. This allows the for the device ID to remain protected. Furthermore, changes or modifications to the operational certificate does not change or modify the device ID of the manufacturing certificate 16.

Figure 9:
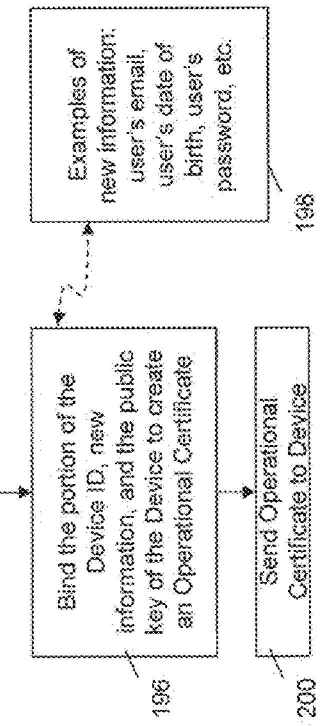
FIG. 9 is a flow diagram continuing from FIG. 6 illustrating example computer executable instructions for using a portion of the device ID and new information to create an operational certificate.

Turning to FIG. 9, another option, as indicated by numeral III, includes binding the obtained portion of the device ID and new information, with the public key of the mobile device 10 in order to create an operational certificate (block 196). New information, for example, may include information specific to the user or to a specific operation on the mobile device 10. Non-limiting examples of new information are provided in block 198 and include the user's email, the user's date of birth, the user's password, etc. After the operational certificate is created, is then sent to the mobile device 10.

Similar to the above options, this option also protects the identity information since the complete identity information is not bound to the operational certificate. In other words, an entity accessing the operational certificate would not be able to retrieve the complete identity information of the mobile device 10. In addition, the combination of the portion of identity information, or device ID, and the new information makes it difficult to identify which information is the identity information and which is the new information. Therefore, an entity who accesses the operational certificate would not be able to easily determine and retrieve the portion of the identity information. Furthermore, changes or modifications to the operational certificate does not change or modify the device ID associated with the manufacturing certificate 16. It can thus be seen that the device ID is protected.

Figure 10:
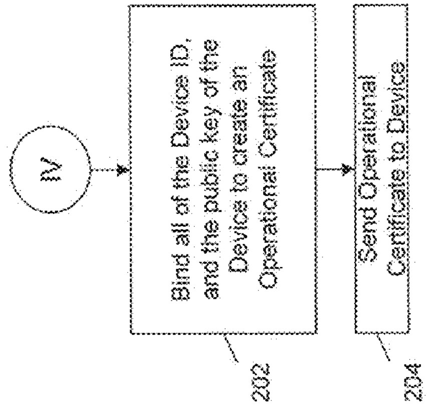
FIG. 10 is a flow diagram continuing from FIG. 6 illustrating example computer executable instructions for using the entire device ID to create an operational certificate.

Turning to FIG. 10, another option, as indicated by numeral IV, includes binding all of the identity information in the device ID with the public key of the mobile device 10 to create an operational certificate (block 202). The operational certificate is then sent to the mobile device 10 (block 204).

This option protects the identity information of the mobile device 10 by allowing the device ID on the manufacturing certificate to remain undisturbed. For example, although an entity may access the operational certificate and modify the information on the operational certificate, the device ID on the manufacturing certificate 16 remains unchanged.

It can be appreciated that in each of the options, as described with respect to FIGS. 7, 8, 9, and 10, for creating an operational certificate, the operational certificate authority 14 signs the operational certificate with its private key. This indicates that the operational certificate was approved by the operational certificate authority 14.

In the above options, it can also be appreciated that the certificate strategy between the manufacturing certificate 16 and the one or more operational certificates allows for the mobile device's identity information to be more easily managed. The identity information, or device ID, is maintained throughout the lifetime of the mobile device 10, since the manufacturing certificate 16 is bound to the mobile device 10 throughout its lifetime. Multiple operational certificates can be appended to the manufacturing certificate 16. Although the operational certificates were created using at least a portion of the device ID of the manufacturing certificate 16, the operational certificates are separate certificates. Therefore, accessing or changing the operational certificates does not access or change the device ID of the manufacturing certificate 16.

It can also be understood that some operational certificate authorities are third parties and, thus, sometimes cannot be trusted. It is possible that the operational certificate authorities may attempt to obtain the device ID to use for fraudulent purposes. Therefore, in some embodiments where only a portion of the identity information or device ID is obtained from the manufacturing certificate 16, the operational certificate authority only receives a portion of the device ID. Thus, the complete device ID is protected from the operational certificate authority.

The certificate strategy described herein provides increased control over the device ID of the manufacturing certificate 16. In particular, during the manufacturing process, the manufacturer has a high degree of confidence in the identity of the mobile device 10. The certainty that the mobile device 10 is authentic is very high. However, once the mobile device 10 leaves the manufacturing plant, changes can be made to the mobile device 10 and thus, the confidence in the mobile device's identity tends to diminish. A user may add or change information associated with the mobile device 10, in order for services or operations to identify with the mobile device 10. By including another level of certificates, i.e. the operational certificates, that is separate from the manufacturing certificate 16, the flexibility to add or change information associated with the mobile device 10 is maintained. As discussed above, new information and changes to the information are more easily made to the operational certificates, which are appended to the manufacturing certificate 16. The high degree of confidence for determining the identity of the mobile device 10 also remains because the device ID or identity information of the manufacturing certificate 16 does not change.

Figure 11:
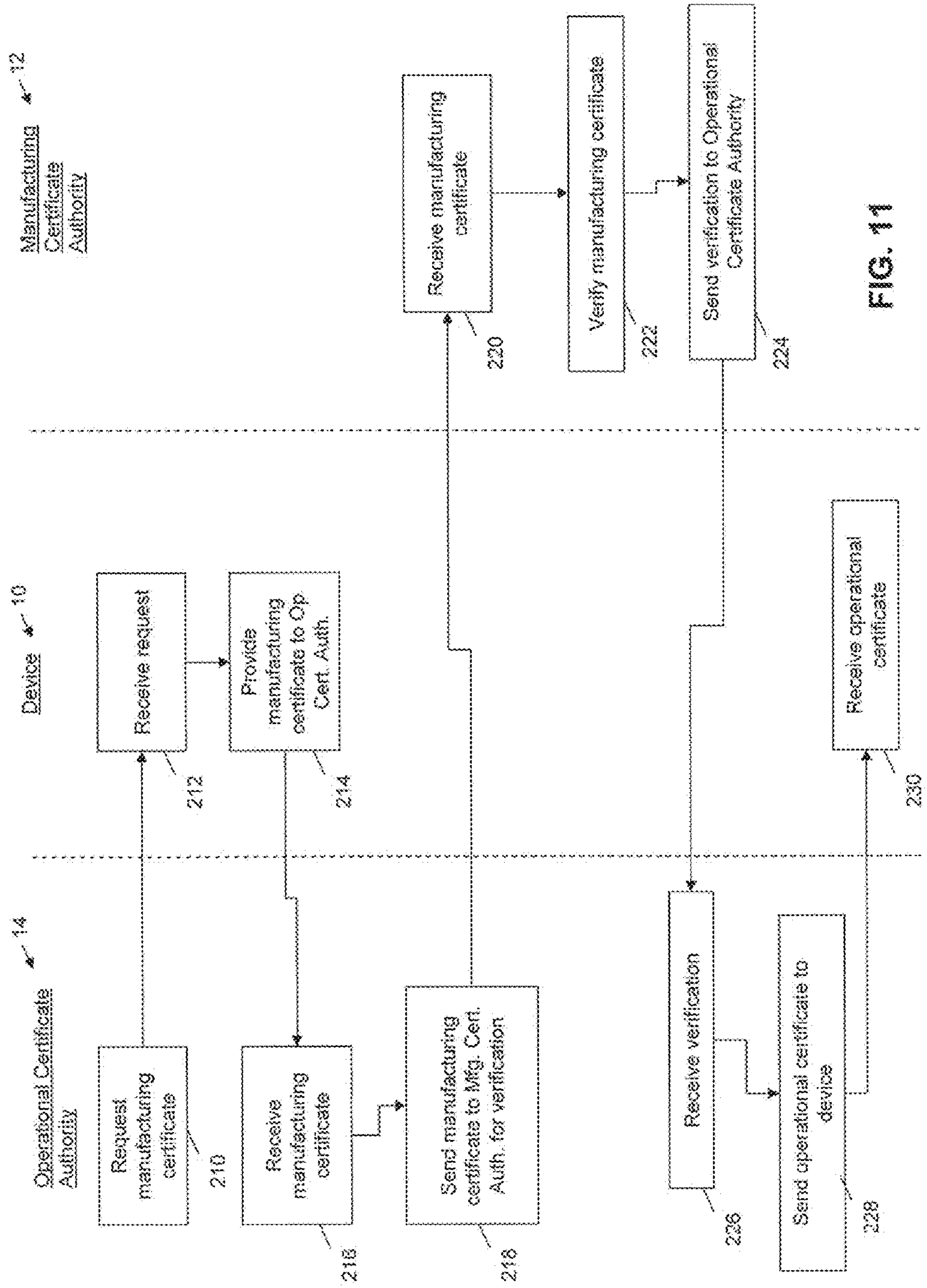
FIG. 11 is a flow diagram illustrating example computer executable instructions for providing a mobile device with an operational certificate.

Turning to FIG. 11, another set of example computer executable instructions for providing an operational certificate to a mobile device 10 is provided. The computer executable instructions of FIG. 11 are executed after a manufacturing certificate 16 has been provided to the mobile device 10. At block 210, the operational certificate authority 14 requests the manufacturing certificate 16 from the mobile device 10. It can be appreciated that the operational certificate authority 14 may also be referred to as a bank or repository of operational certificates. At block 212 the mobile device 10 receives the request and provides the manufacturing certificate 16 to the operational certificate authority 14 (block 214). At block 216, the operational certificate authority 14 receives the manufacturing certificate 16 and then sends the manufacturing certificate 16 to the manufacturing certificate authority 12 for verification (block 218). It can be appreciated that the manufacturing certificate 16 may contain the identity information of the manufacturing certificate authority 12 as well, which can be used by the operational certificate authority 14 to determine which manufacturing certificate authority 12 to contact. It can also be understood that the process described with respect to FIG. 1 may be suitable when a trusted relationship between the operational certificate authority 14 and the manufacturing certificate authority 12 has not been established.

At block 220, the manufacturing certificate authority 12 receives the manufacturing certificate 16. It can be appreciated that the manufacturing certificate authority 16 may be the original equipment manufacturer (OEM) of the mobile device 10. At block 222, the manufacturing certificate authority 12 verifies the manufacturing certificate 16. This would take place by comparing the signature of the manufacturing certificate 16, which has been signed by the manufacturing certificate authority 12 during the manufacturing stage. At block 224, the verification, i.e. whether the manufacturing certificate 16 is verified or not, is sent to the operational certificate authority 14. Upon receiving the verification (block 226), if it is positively verified, then the operational certificate authority 14 assigns or provides an operational certificate to the mobile device 10 (block 228). At block 230, the mobile device 10 receives the operational certificate.

Figure 12:
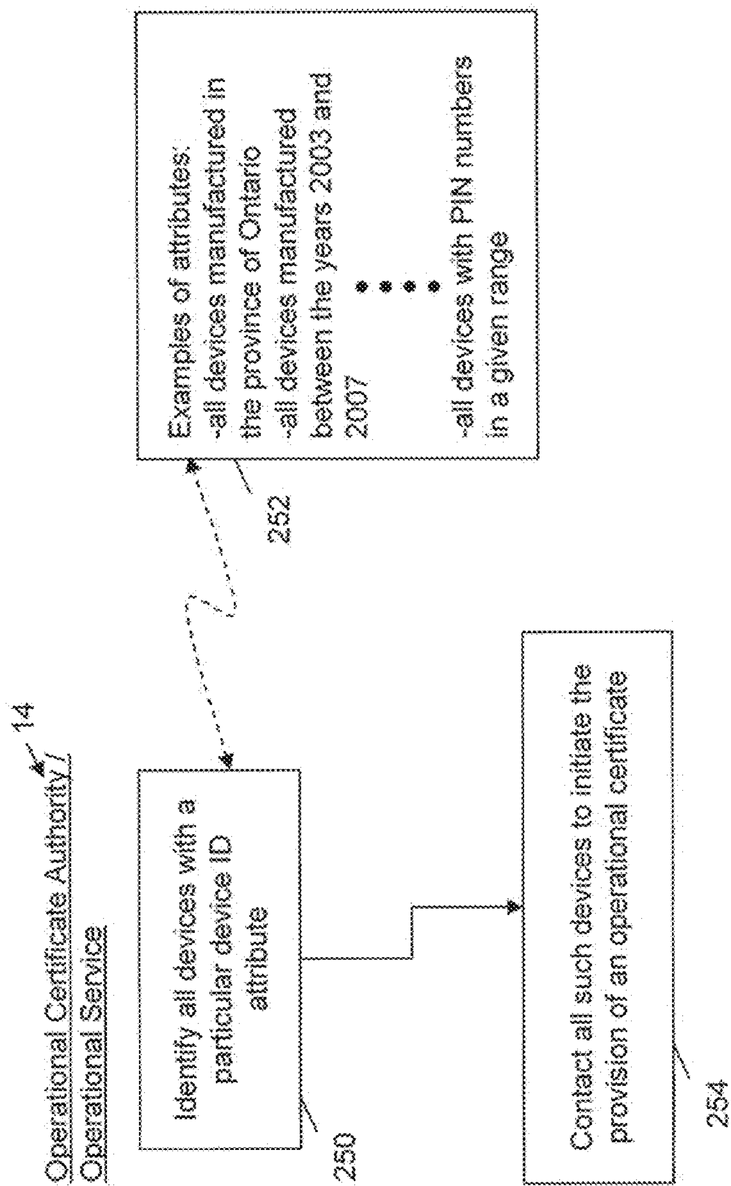
FIG. 12 is a flow diagram illustrating example computer executable instructions for an operational certificate authority initiating contact with mobile devices based on the device ID.

Turning to FIG. 12, example computer executable instructions are also provided for an operational certificate authority 14 initiating communication with one or more mobile devices 10 based on one or more particular attributes identified within the device ID. It can be appreciated that these computer executable instructions can be used in combination with the other methods described above, for example with respect to FIG. 6 and FIG. 11. At block 250, the operational certificate authority 14 identifies all mobile devices 10 with a particular attribute found in the device ID. If the operational service is a separate entity from the operational certificate authority 14, then the operational service takes on the responsibility to identify mobile devices 10 with a particular attribute. Non-limiting examples of such attributes are found at block 252. For example, all mobile devices 10 that are manufactured in the province of Ontario, Canada are identified. In another example, all mobile devices 10 manufactured between the years 2003 and 2007 are identified. In another example, all mobile devices 10 with PIN numbers within a given range are identified. Various attributes or combinations of attributes that reside in the device ID may be used to select the one or more mobile devices 10. Upon identifying the mobile devices 10 having certain attributes, at block 254, the operational certificate authority 14 contacts all the identified mobile devices 10 to initiate the provision of an operational certificate to each of the identified mobile devices 10.

It can therefore be seen that maintaining the device ID in the manufacturing certificate allows for an entity, such as the operational certificate authority or the manufacturing certificate authority, to contact certain of the mobile devices 10 based on the attributes of the device ID. This can be used, for example, to update operational certificates. This can also be used by the manufacturing certificate authority to update device ID information. In a preferred embodiment, the entities (e.g. operational certificate authorities and manufacturing certificate authority) are trusted by the manufacturer of the mobile device 10, since they are provided with information about the different attributes about the device ID.

In another embodiment, not shown, for each update that is made to an operational certificate, information regarding the update is sent to the manufacturing certificate authority 12.

The certificate strategy described herein also allows for a security service provided or the manufacturer to more easily control the access or use of certain operations or functions on the mobile device 10, even after the mobile device 10 leaves the manufacturing process. For example, the manufacturing certificate 16 may only allow a certain portion of the device ID to be accessed or viewed by other entities ancillary to the manufacturer. There may be a process that requires certain identity information of the device ID to be accessed in order for an operational certificate to be assigned. However, the manufacturer, for example through the manufacturing certificate authority 12, controls which portions of the device ID are able to be shared or revealed in order to control which operations on a mobile device 10 are able to be activated. Alternatively, a security service may wish to control which portion of the device ID on mobile device's manufacturing certificate are able to be shared with other entities. In other words, the different portions or attributes of the identity information may be independently revealed or shared with an operational certificate authority or operational service.

Figure 13:
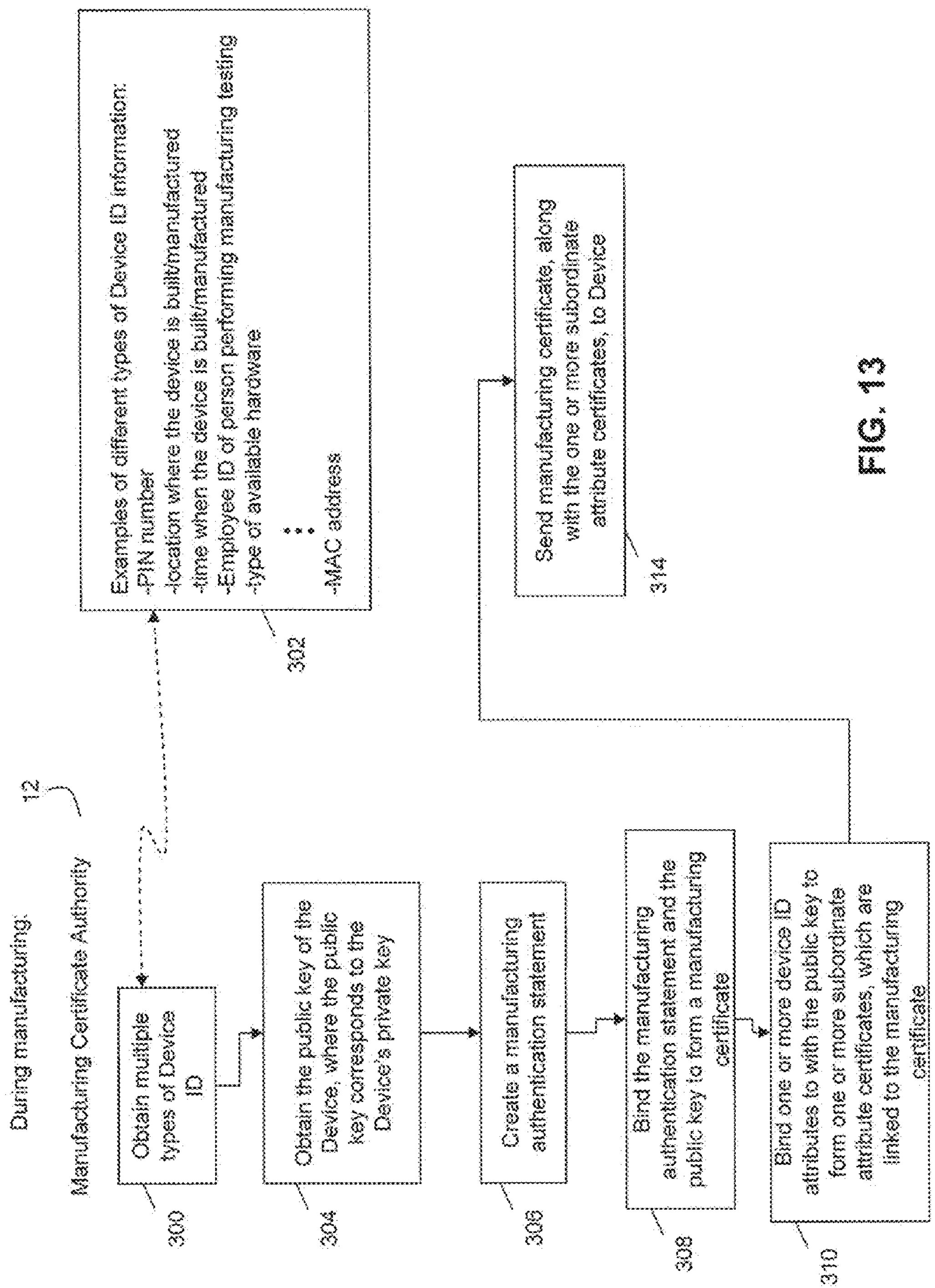
FIG. 13 is a flow diagram illustrating example computer executable instructions for a manufacturing certificate authority providing a manufacturing certificate and one or more subordinate attribute certificates to a mobile device.

Turning to FIG. 13, a set of example computer executable instructions are provided for providing a manufacturing certificate 16 and associated attribute certificates, whereby the attribute certificates are subordinate or considered to be at a different level associated with the manufacturing certificate 16. In the embodiment described with respect to FIG. 13, an attribute certificate contains the identity information or device ID. In this way, the manufacturing certificate 16 does not contain device ID information, although it has associated it with it one or more attribute certificates, whereby the ability to share or reveal the attribute certificates can be more easily controlled. For example, when accessing the manufacturing certificate 16, certain attribute certificates are not revealed or are inaccessible, while other attribute certificates are revealed or accessible.

In FIG. 13, at block 300, the manufacturing certificate authority 12, or its delegate (e.g. registration authority) obtains multiple types of device ID, non-limiting examples of which are listed in block 302 (e.g. PIN number, MAC address for different hardware components, types of hardware, etc.). At block 304, the manufacturing certificate authority 12 obtains the public key of the mobile device 10, where the public key corresponds to the mobile device's private key. At block 306, the manufacturing certificate authority 12 creates a manufacturing authentication statement, which is an indication that the mobile device 10 is authentic as perceived by the manufacturer and the manufacturing certificate authority. At block 308, the manufacturing authentication statement and the public key are bound together to form a manufacturing certificate 16. At block 310, the manufacturing certificate authority 12 binds one or more device ID attributes with the public key to form one or more subordinate attribute certificates, which are linked to the manufacturing certificate 16. The division of device ID attributes into the subordinate attribute certificates may vary, whereby several identity information attributes may be grouped together into an attribute certificate, or each identity information attribute is placed into a separate attribute certificate.

At block 314, the manufacturing certificate 16, along with the one or more subordinate attribute certificates, is sent to the mobile device 10.

Preferably, a security service (not shown) on the mobile device 10 determines which of the attribute certificates are revealed or shared to certain of the operational certificate authorities or operational services. In another embodiment, the manufacturing certificate authority 12 may also optionally restrict access to one or more of the subordinate attribute certificates. More generally, the ability to mange which of the attributes of identity information are shared or revealed, allows for better protection of the mobile device's identity.

Figure 14:
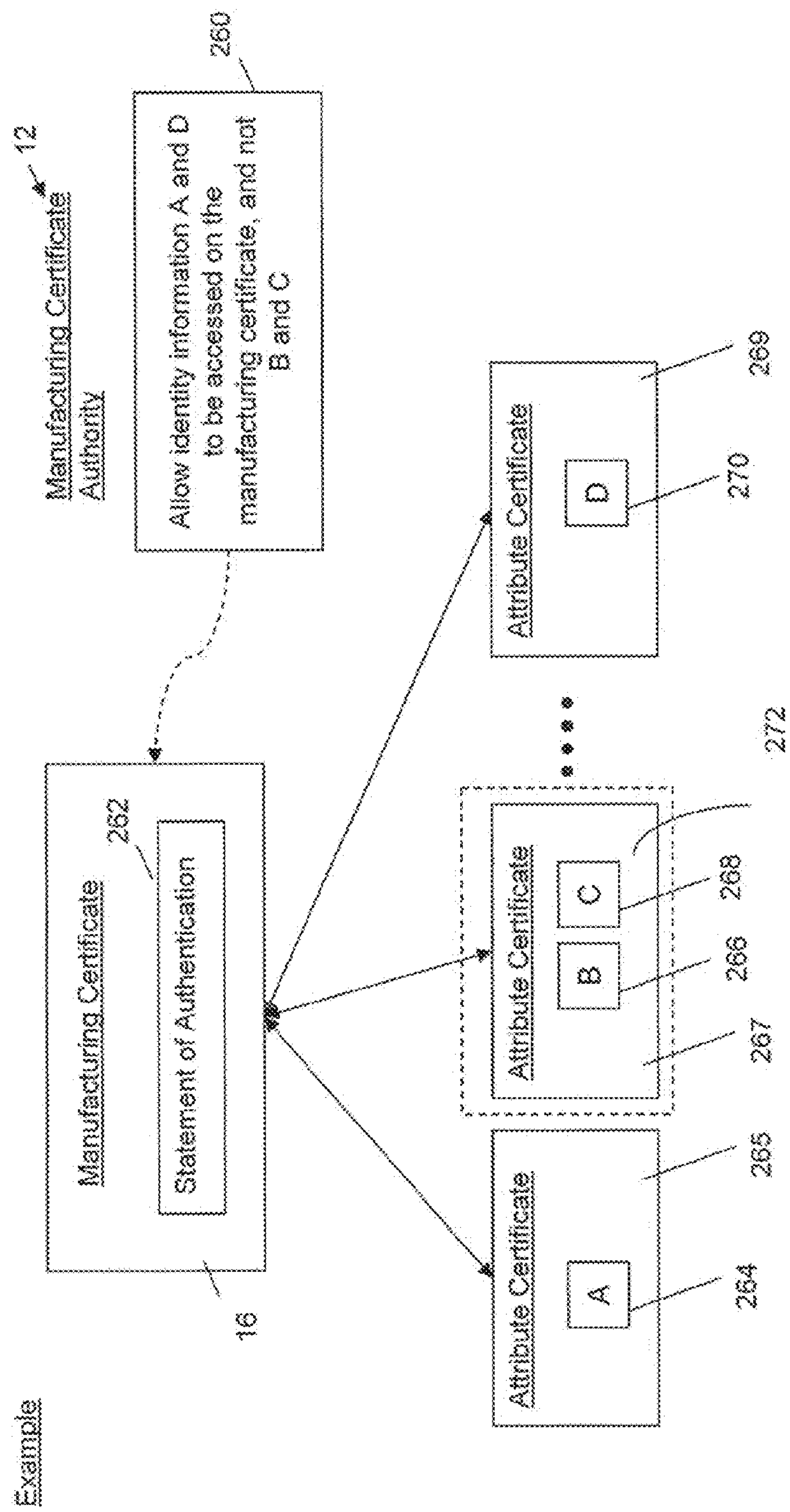
FIG. 14(*a*) is a block diagram of a manufacturing certificate with subordinate attribute certificates containing different portions of device ID, certain of which can be managed independently of each other.
Figure 14:
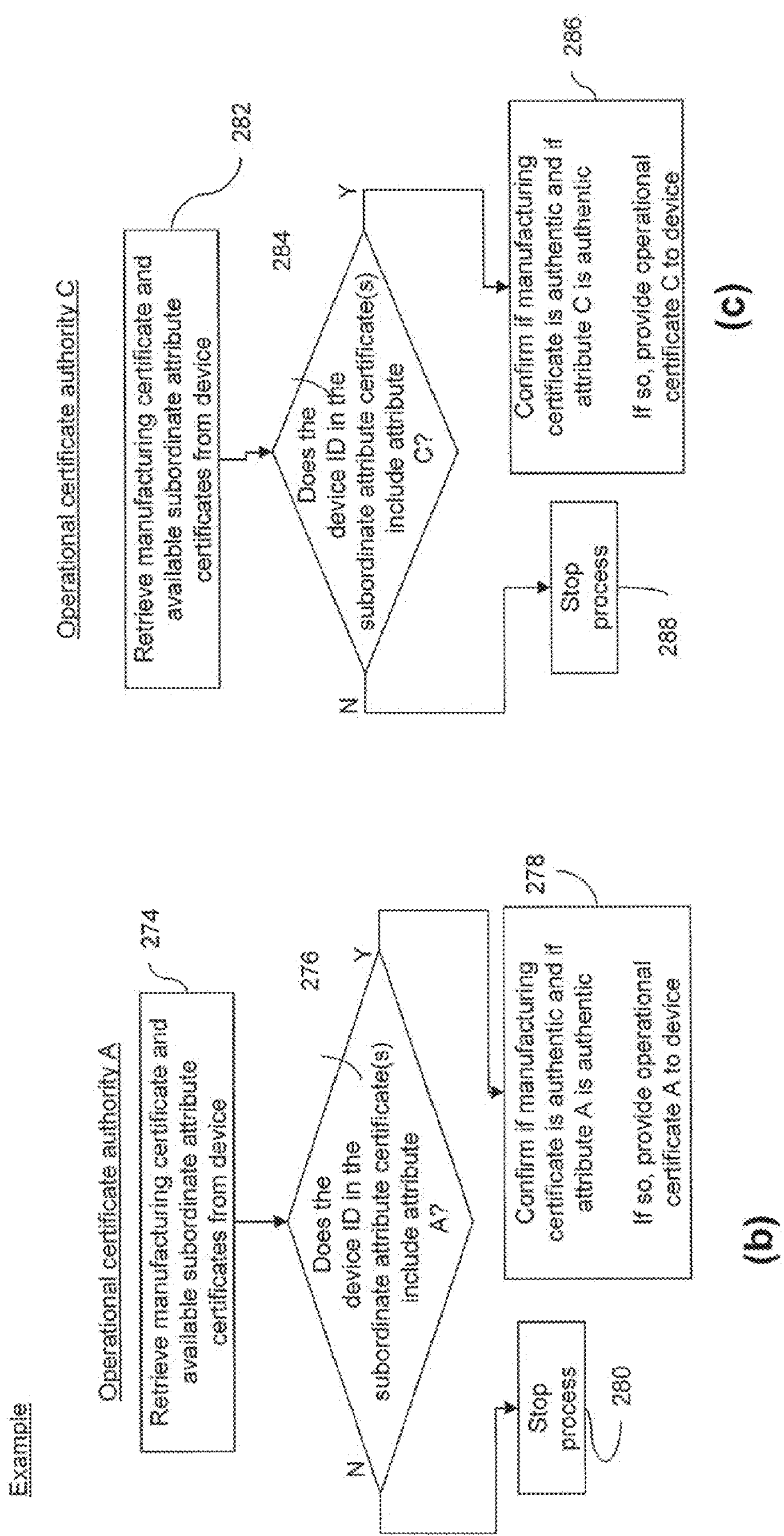

Turning to FIGS. 14 (*a*), (*b*) and (*c*), diagrams illustrating an example of how identity information can be used to control the assigning of operational certificates to a mobile device 10 is provided. In FIG. 14 (*a*), a manufacturing certificate 16 including a statement of authentication 262 is shown. When the manufacturing certificate 16 was created, the device ID included several types or portions of identity information, denoted as A 264, B 266, C 268 and D 270. The manufacturing certificate authority 12 created the manufacturing certificate 16 and associated identity information A 264 into one attribute certificate 265. Identity information B 266 and identity information C 268 are both associated with a different attribute certificate 267. Identity information D 270 is associated with another attribute certificate 269. The attribute certificates 265, 267, 269 are subordinate or linked at a lower level to the manufacturing certificate 16. As indicated by the box 272 illustrated with dotted lines, the manufacturing certificate authority 12 has restricted access to the attribute certificate 272, which contains identity information B 266 and C 268. In other words, another entity, such as an operational certificate authority 14, would not be able to access or obtain identity information B 266 and C 268.

In FIG. 14 (*b*), example computer executable instructions are provided for operational certificate authority A to provide an operational certificate A to the mobile device 10, based on the manufacturing certificate 16 having the available or accessible device ID shown in FIG. 14 (*a*). The operational certificate authority A, at block 274, retrieves the manufacturing certificate 16 and available subordinate attribute certificates (e.g. 265, 267) from the mobile device 10. In this example, the available identity information in the device ID does not include B 266 C 268. At block 276, the operational certificate authority B determines if the device ID in the accessible subordinate attribute certificate(s) include identity information A 264. In this example, as a rule, operational certificate authority A requires that the device ID include identity information A 264 in order to issue operational certificate A to the mobile device 10. If the device ID does include the information, which in this example it does, then at block 278, the operational certificate authority A confirms if manufacturing certificate 16 is authentic, as well if attribute certificate 265 and the identity information A 264 is authentic. If so, operational certificate A is provided to the mobile device 10. If not, then the process is stopped (block 280).

In FIG. 14 (*c*), example computer executable instructions are provided for operational certificate authority C to provide an operational certificate C to the mobile device 10, based on the manufacturing certificate 16, in this case its attribute certificates, having the device ID shown in FIG. 14 (*a*). The operational certificate authority C, at block 282, retrieves the manufacturing certificate 16 and the available subordinate attribute certificates from mobile device 10. As described above, in this example, the available identity information in the device ID is provided within the attribute certificates, some of which are not accessible. In particular, A 264 is attribute certificate 265 is accessible, and B 266 and C 268 in attribute certificate 267 is not accessible, and D 270 in attribute certificate 269 is accessible. At block 284, the operational certificate authority C determines if the device ID in the accessible subordinate attribute certificate(s) include identity information C 268. In this example, as a rule, operational certificate authority C requires that the device ID include identity information C 268 in order to issue operational certificate C to the mobile device 10. If the available device ID does not include the information, which in this example it does not, then at block 288, the process is stopped. However, if the available device ID did include the information, then the identity information C 268 is confirmed to be authentic before providing operational certificate C to the mobile device 10. Additionally, the manufacturing certificate 16 and the attribute certificate 272 could also be authenticated. It can therefore be appreciated that controlling the accessibility of the attribute certificates, which are subordinate to the manufacturing certificate 16, allows the accessibility to the identity information in the device ID to be more easily controlled. In this way, the activation of certain operations or functions on a mobile device 10 can be managed using the certificate strategy described herein.

In another example, not shown, a manufacturer may desire to inhibit a certain function (e.g. instant messaging function) on all mobile devices 10 manufactured in the province of Ontario, Canada. To do so, the manufacturing certificate authority makes the identity information regarding the place of manufacture inaccessible in the manufacturing certificate, when providing manufacturing certificates to all devices manufactured in Ontario. This action is performed knowing that the operational certificate authority issuing operational certificates for the certain function requires the place of issuance. However, since this information is not accessible from all devices manufactured in Ontario, the operational certificate authority is not able to provide these mobile devices 10 with an operational certificate associated with the certain function.

The steps or operations in the flow charts described herein are just for example. There may be many variations to these steps or operations without departing from the spirit of the invention or inventions. For instance, the steps may be performed in a differing order, or steps may be added, deleted, or modified.

Although the above principles have been described with reference to certain specific embodiments, various modifications thereof will be apparent to those skilled in the art without departing from the scope of the claims appended hereto.

The invention claimed is:

1. A method for providing an operational certificate to a device, the operational certificate associated with one or more operations of the device, the method comprising:

a manufacturing certificate authority comprising a computing device, the manufacturing certificate authority obtaining a plurality of attributes during the manufacture of the device, each attribute comprising identity information associated with the device;

the manufacturing certificate authority providing a plurality of attribute certificates to the device, each attribute certificate comprising at least one of the plurality of attributes;

the manufacturing certificate authority providing a manufacturing certificate to the device, the manufacturing certificate linked with the plurality of attribute certificates;

an operational certificate authority obtaining and authenticating at least one of the plurality of attribute certificates through accessing the manufacturing certificate, the device or the manufacturing certificate authority restricting the operational certificate authority's access to at least another one of the plurality of attribute certificates; and, if the at least one of the plurality of attribute certificates is authenticated, the operational certificate authority providing the operational certificate to the device.

2. The method of claim 1 wherein a public key and a corresponding private key are associated with the device.

3. The method of claim 2 wherein the manufacturing certificate authority generates each attribute certificate by binding the at least one attribute with the public key.

4. The method of claim 2 wherein the manufacturing certificate authority generates the manufacturing certificate by binding the public key with a manufacturing authentication statement, the manufacturing authentication statement generated by the manufacturing certificate authority indicating the device is authentic.

5. The method of claim 1 wherein after the operational certificate authority identifies a certain attribute associated with the device, the operational certificate authority communicates with the device to initiate provisioning of the operational certificate.

6. The method of claim 1 wherein the operational certificate comprises at least one attribute associated with the device.

7. The method of claim 1 wherein the operational certificate comprises none of the plurality of attributes associated with the device.

8. The method of claim 1 wherein the manufacturing certificate remains with the device throughout the device's operational lifetime.

9. The method of claim 1 wherein the operational certificate is modified without modifying the manufacturing certificate.

10. The method of claim 1 wherein the identity information comprises any one of a PIN number, a location of the device's manufacture, a time associated with the device's manufacture, an employee identification of a person associated with the device's manufacture, a listing of available hardware on the device, a listing of hardware capabilities on the device, a Media Access Control (MAC) address, or combinations thereof.

11. The method of claim 1 wherein the operational certificate comprises the at least one attribute and user provided information.

12. The method of claim 1 wherein the one or more operations comprise any one of email, GPS, instant messaging, phone service, address book, and banking.

13. A system for providing an operational certificate to a device, the operational certificate associated with one or more operations of the device, the system comprising:

a manufacturing certificate authority, during the manufacture of the device, obtaining a plurality of attributes, each attribute comprising identity information associated with the device;

the manufacturing certificate authority providing a plurality of attribute certificates to the device, each attribute certificate comprising at least one of the plurality of attributes;

the manufacturing certificate authority providing a manufacturing certificate to the device, the manufacturing certificate linked with the plurality of attribute certificates;

an operational certificate authority obtaining and authenticating at least one of the plurality of attribute certificates through accessing the manufacturing certificate, the device or the manufacturing certificate authority restricting the operational certificate authority's access to at least another one of the plurality of attribute certificates; and, if the at least one of the plurality of attribute certificates is authenticated, the operational certificate authority providing the operational certificate to the device.

14. The system of claim 13 wherein a public key and a corresponding private key are associated with the device.

15. The system of claim 14 wherein the manufacturing certificate authority generates each attribute certificate by binding the at least one attribute with the public key.

16. The system of claim 14 wherein the manufacturing certificate authority generates the manufacturing certificate by binding the public key with a manufacturing authentication statement, the manufacturing authentication statement generated by the manufacturing certificate authority indicating the device is authentic.

17. The system of claim 13 wherein after the operational certificate authority identifies a certain attribute associated with the device, the operational certificate authority communicates with the device to initiate provisioning of the operational certificate.

18. The system of claim 13 wherein the operational certificate comprises at least one attribute associated with the device.

19. The system of claim 13 wherein the operational certificate comprises none of the plurality of attributes associated with the device.

20. The system of claim 13 wherein the manufacturing certificate remains with the device throughout the device's operational lifetime.

21. The system of claim 13 wherein the operational certificate is modified without modifying the manufacturing certificate.

22. The system of claim 13 wherein the identity information comprises any one of a PIN number, a location of the device's manufacture, a time associated with the device's manufacture, an employee identification of a person associated with the device's manufacture, a listing of available hardware on the device, a listing of hardware capabilities on the device, a Media Access Control (MAC) address, or combinations thereof.

23. The system of claim 13 wherein the operational certificate comprises the at least one attribute and user provided information.

24. The system of claim 13 wherein the one or more operations comprise any one of email, GPS, instant messaging, phone service, address book, and banking.

* * * * *